(12) United States Patent
Van Neste et al.

(10) Patent No.: US 11,619,204 B2
(45) Date of Patent: Apr. 4, 2023

(54) WIND AEOLIPILE

(71) Applicant: TENNESSEE TECHNOLOGICAL UNIVERSITY, Cookeville, TN (US)

(72) Inventors: Charles William Van Neste, Cookeville, TN (US); David Wenzhong Gao, Denver, CO (US)

(73) Assignee: TENNESSEE TECHNOLOGICAL UNIVERSITY, Cookeville, TN (US)

( * ) Notice: Subject to any disclaimer, the term of this patent is extended or adjusted under 35 U.S.C. 154(b) by 0 days.

(21) Appl. No.: 17/305,249

(22) Filed: Jul. 2, 2021

(65) Prior Publication Data

US 2021/0343293 A1 Nov. 4, 2021

Related U.S. Application Data

(63) Continuation of application No. 15/709,199, filed on Sep. 19, 2017, now Pat. No. 11,073,128, which is a
(Continued)

(51) Int. Cl.
| | |
|---|---|
| *F03D 1/06* | (2006.01) |
| *F03B 3/12* | (2006.01) |
| *F03D 15/00* | (2016.01) |

(52) U.S. Cl.
CPC ............ *F03D 1/06* (2013.01); *F03B 3/126* (2013.01); *F03D 1/0625* (2013.01); *F03D 15/05* (2016.05); *F05B 2240/20* (2013.01); *Y02E 10/72* (2013.01)

(58) Field of Classification Search
CPC ........ F03D 1/06; F03D 1/0625; F03D 1/0666; F03D 3/06; F03D 3/061; F03D 3/062;
(Continued)

(56) References Cited

U.S. PATENT DOCUMENTS

| | | | |
|---|---|---|---|
| 2,001,529 | A | 5/1935 | Dornier |
| 2,131,472 | A | 9/1938 | Coanda |
(Continued)

FOREIGN PATENT DOCUMENTS

| | | |
|---|---|---|
| CH | 564687 | 7/1975 |
| DE | 4030559 A1 | 4/1992 |
(Continued)

OTHER PUBLICATIONS

Machine translation of EP 1635056 A1 (Mar. 15, 2006) (Year: 2006).*

*Primary Examiner* — Christopher R Legendre
(74) *Attorney, Agent, or Firm* — Andre J. Bahou; Christoper T. McNeill; Holland & Knight LLP

(57) ABSTRACT

A high-efficiency, hybrid fluid aeolipile is placed in the stream of a moving fluid, preferably air. Energy is extracted from the fluid stream by directing a portion of the stream through and, optionally, around the device. As the fluid flow moves through the device, it is directed into nozzles. These nozzles, which are free to pivot in a cyclical manner, employ the established phenomenon of "nozzle effect" to accelerate the velocity of the air-flow passing through them, which is ultimately ejected from each nozzle tip, producing thrust. This thrust, amplified by nozzle effect, drives the nozzles to pivot around a shared axis. The wind energy, thereby converted into cyclical motion, that may be used to perform useful work, is converted with greater efficiency than is possible in conventional blade-type wind turbines.

19 Claims, 15 Drawing Sheets

Related U.S. Application Data continuation of application No. 14/090,280, filed on Nov. 26, 2013, now Pat. No. 9,765,755, which is a continuation of application No. 12/592,119, filed on Nov. 19, 2009, now Pat. No. 8,591,174.

(60) Provisional application No. 61/199,771, filed on Nov. 20, 2008.

(58) Field of Classification Search
CPC .. F03D 3/065; F03D 15/05; F03B 3/12; F03B 3/121; F03B 3/126; F05B 2240/20; F05B 2240/21; F05B 2240/221; Y02E 10/72; Y02E 10/721; B64C 27/18; F01D 1/32
See application file for complete search history.

(56) References Cited

U.S. PATENT DOCUMENTS

| | | | |
|---|---|---|---|
| 2,474,685 A | 6/1949 | Mccollum | |
| 2,485,543 A | 10/1949 | Andreau | |
| 2,548,804 A | 4/1951 | Mccollum | |
| 2,799,989 A | 7/1957 | Kappus | |
| 2,831,543 A | 4/1958 | Matthews | |
| 3,008,293 A | 11/1961 | Servanty | |
| 3,129,767 A | 4/1964 | Mclean | |
| 3,279,546 A | 10/1966 | Albers | |
| 4,069,662 A | 1/1978 | Redinger, Jr. et al. | |
| 4,421,452 A | 12/1983 | Rougemont | |
| 4,684,316 A * | 8/1987 | Karlsson | F03D 1/04 415/908 |
| 5,236,349 A | 8/1993 | Fabris | |
| 5,560,196 A | 10/1996 | Schlote | |
| 6,492,743 B1 | 12/2002 | Appa | |
| 6,668,539 B2 * | 12/2003 | Schlote | F01D 1/32 415/80 |
| 6,877,960 B1 | 4/2005 | Presz, Jr. et al. | |
| 8,591,174 B1 | 11/2013 | Gao et al. | |
| 9,765,755 B2 | 9/2017 | Gao et al. | |
| 2005/0151030 A1 | 7/2005 | Arnaud | |

FOREIGN PATENT DOCUMENTS

| | | |
|---|---|---|
| DE | 4414208 A1 | 10/1995 |
| DE | 19845907 A1 | 4/2000 |
| DE | 202008000543 U | 3/2008 |
| EP | 1635056 A1 | 3/2006 |
| FR | 1090979 A | 4/1955 |
| FR | 2335135 | 7/1977 |
| FR | 2484026 A2 | 12/1981 |
| FR | 2959281 A1 | 10/2011 |
| GB | 682627 A | 11/1952 |
| GB | 700879 A | 12/1953 |
| GB | 2080230 A | 2/1982 |
| JP | S555442 A | 1/1980 |

* cited by examiner

WIND AEOLIPILE

This application is a continuation of U.S. patent application Ser. No. 15/709,199, entitled "Wind Aeolipile," filed Sep. 19, 2017, which issued as U.S. Pat. No. 11,073,128 on Jul. 27, 2021; which is a continuation of U.S. patent application Ser. No. 14/090,280, entitled "Wind Aeolipile," filed Nov. 26, 2013, which issued as U.S. Pat. No. 9,765,755 on Sep. 19, 2017; which is a continuation of U.S. patent application Ser. No. 12/592,119, entitled "Wind Aeolipile," filed Nov. 19, 2009, which issued as U.S. Pat. No. 8,591,174 on Nov. 26, 2013; which claims the benefit of and priority to U.S. Provisional Application No. 61/199,771, entitled "Wind Aeolipile," filed Nov. 20, 2008; all of which are incorporated by reference in their entirety.

FIELD OF INVENTION

This invention relates generally to the field of deriving energy from wind, and specifically to a wind-energy extraction device that is superior to wind turbines that employ rotating blades to extract energy from wind.

BACKGROUND OF THE DISCLOSURE

Extant wind turbines are based on the aerodynamic principles of a wing. The turbine is equipped with wing-shaped turbine blades. As wind blows across the wing-shaped turbine blades, pressure differences generated on either side of the blades, in accordance with Bernoulli's Law, create aerodynamic force or lift. This induces the blades to rotate, and the rotation drives an electric generator.

The maximum efficiency, according to Betz's law, that a bladed wind turbine can achieve is approximately 59.3%. This has long been considered an absolute limiting function with respect to use of the wind to generate usable energy.

This wind to power extraction available for bladed wind turbines is expressed by the following equation:

$$P = \rho A v^3$$

where P is the power in watts, $\rho$ is the density of air, A is the cross sectional area swept by the blades, and v is the velocity of the wind.

One may easily surmise, then, that the bladed turbine engineer's only practical means of increasing the power output of a given bladed wind turbine design is to increase the swept area of the blades. This produces only a linear, or one-to-one, increase in power output, swept-area unit per power-unit.

However, again, referring to the equation, if flow velocity could be increased, a disproportionate benefit would be derived. For example, a mere 50% increase in flow velocity would quadruple the theoretical power output. A number of turbine designers, in pursuit of this disproportionate benefit, have attempted to exceed Betz limit by exploiting the Venturi effect of a shroud or casing so configured as to act as a giant nozzle surrounding essentially conventional turbine blades to increase the wind velocity impinging upon them. The blades in such designs, however, remain as a limiting factor.

BRIEF SUMMARY

In contrast to the prior art, the herein taught invention uses a novel approach to the energy translation problem discussed above. It substitutes convergent/divergent, or Venturi, nozzles, resembling those such as would be employed by rockets, in place of turbine blades and thereby provides a means by which wind velocity through the device may be amplified. The convergence/divergence as embodied herein may be contained entirely within the nozzle or may be manifested by convergence of conduit guided fluid flow which diverges only at ejection. But in either case, by amplifying this flow velocity, and commensurately, the ejection velocity at the nozzle, a significant increase in output energy is realized. The increase in output energy, as expressed by the above equation, is not a linear function but is, rather, a function of the cube of the nozzle ejection velocity increase.

If we compare this method of increasing energy output by using nozzles to increase ejection velocity to the method of increasing output by increasing the blades swept area, the advantage is clear. The ratio of increase based on blade swept area is merely one-to-one. The increase based on increased ejection velocity, however, is a cubic function, the output energy increasing as a cube of the nozzle ejection velocity.

By exploiting the advantage of the velocity to power function, this invention is able to essentially circumvent the limitations of Betz's law by eliminating the employment of precisely the physical components (turbine blades) to which Betz's law applies.

A computational computer model using popular, commercially available three-dimensional and computational fluid dynamics, or CFD, software, was developed for this aeolipile invention to obtain torque production formula, derive efficiency limits, and demonstrate practicality. Simulations were conducted for a single thrust nozzle to establish flow parameters. For these simulations, an inlet velocity of 2 m/sec was chosen. After 1600 iterations, the corresponding outlet velocity was found to be near 17 m/sec, a flow velocity increase of 15 m/sec, thereby validating the inventions theoretical functionality.

Tests were also conducted with respect to an expanded wind-gathering configuration of a horn-shaped inlet extension as in FIG. 7, below. The test employed inlet airflow velocities of 2, 4, 6, 8, 10, and 12 m/sec and were repeated for various inlet/outlet size ratios. FIG. 8, below, plots the flow velocity increases, produced for each inlet/outlet size ratio.

An object of the invention is to provide a means of deriving energy from fluid flow. An application of this invention is translation of wind energy into useful work or into electrical, mechanical, or hydraulic energy.

Other objects and advantages of the present invention will become apparent from the following descriptions, taken in connection with the accompanying drawings wherein, by way of illustration and example, an embodiment of the present invention is disclosed.

In accordance with a preferred embodiment of the invention, there is disclosed a device for extracting energy from fluid flow.

LIST OF NUMBERED ELEMENTS

110—nozzle inlet
120—main conduit
130—nozzle outlet
135—divergent nozzle outlet
140—thrust nozzle
142—nozzle choke device
143—eductor-ejector inlet
144—flaps or spoiler
145—blade-shaped thrust nozzle
150—center axis
155—generator, transmission, pump, or other energy translation/transmission device
160—narrow opening between shroud and aeolipile inlet
170—cylinder or shroud
180—horn-shaped inlet extension
185—horn inlet
187—horn outlet
190—aeolipile
A—airflow
A1—bypass airflow
A2—re-circulating airflow
T—torque

DETAILED DESCRIPTION OF THE PREFERRED EMBODIMENTS

Figure 1:
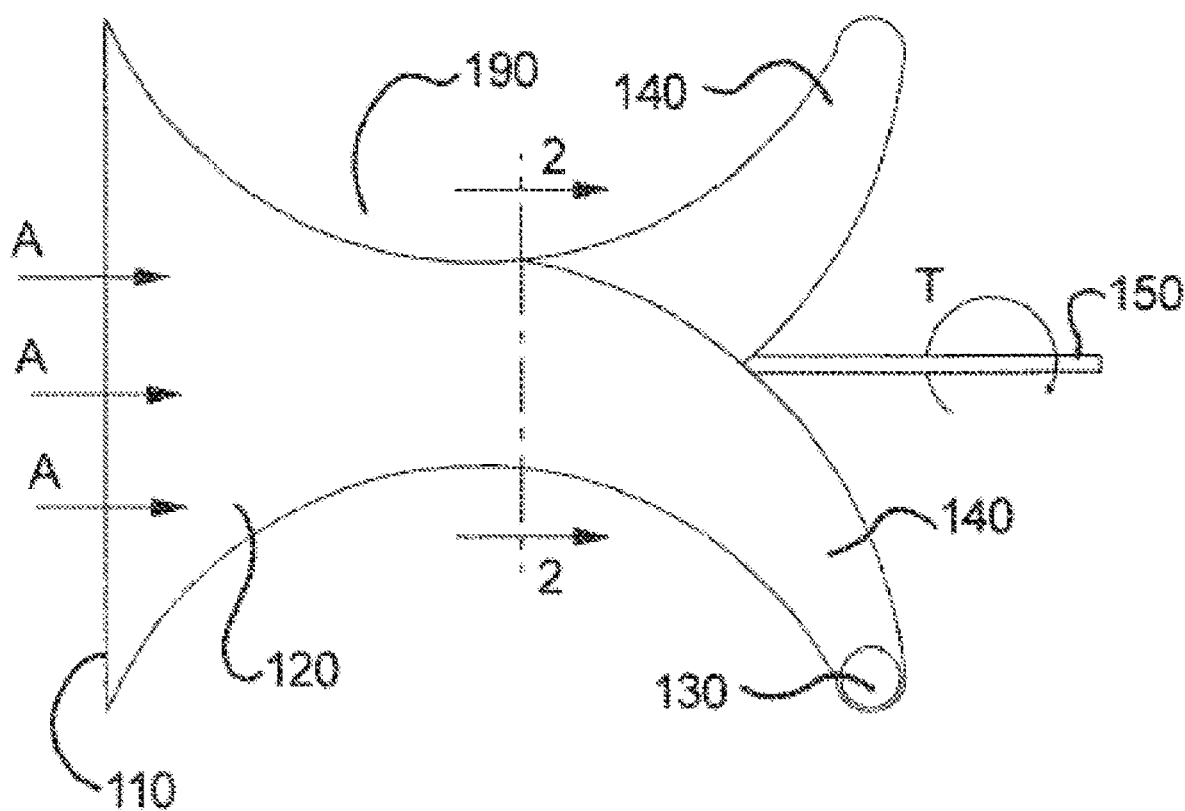
FIG. 1 is a side view of a first embodiment of the wind aeolipile.
Figure 2A:
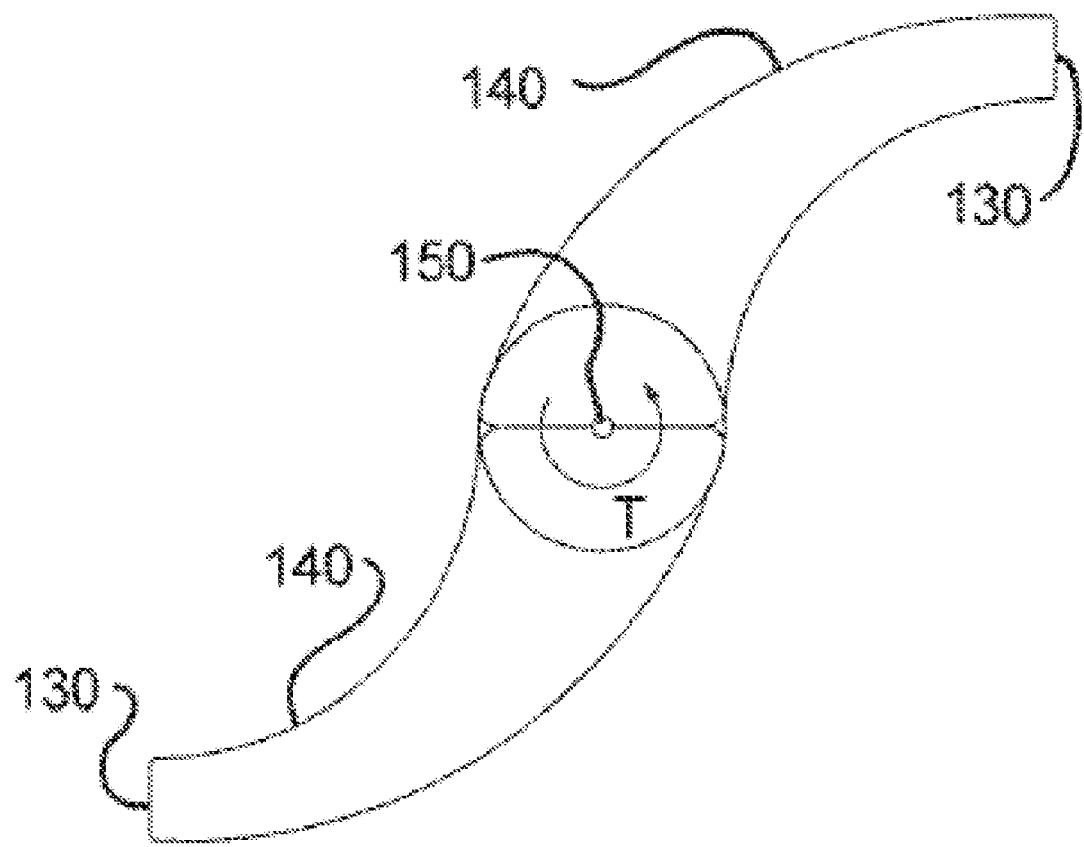
FIG. 2A is a front cross-sectional view of the first embodiment of the wind aeolipile.

In a first embodiment, as in FIG. 1 and FIG. 2A, airflow (A) is directed into a main conduit (120) from an enlarged nozzle inlet (110). The air will become slightly compressed as it is forced down the thrust nozzles (140), leaving the nozzle outlets (130) at right angles to the nozzle inlet (110).

Figure 2B:
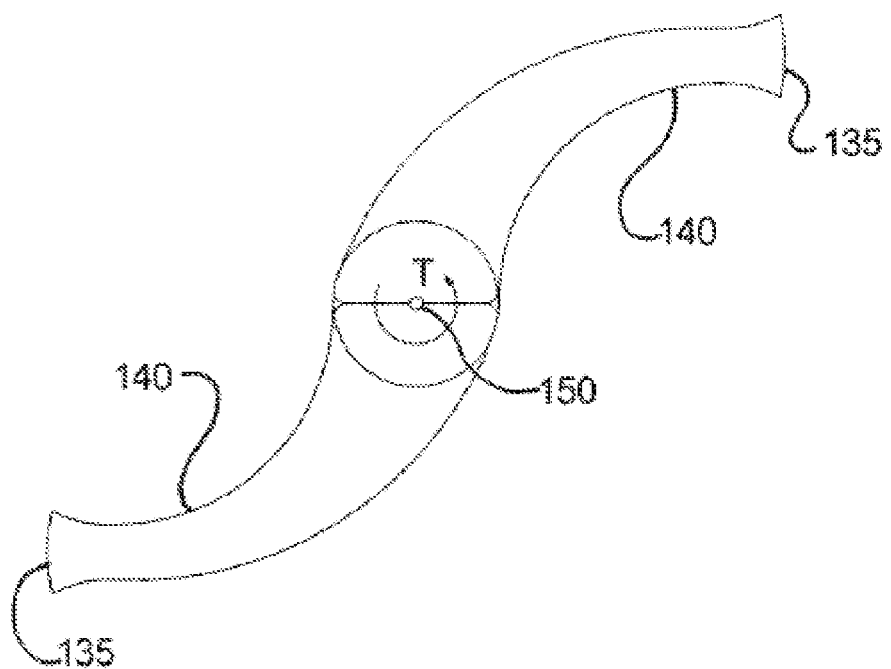
FIG. 2B is a front cross-sectional view of the first embodiment of the wind aeolipile employing divergent nozzle outlets.

The thrust nozzles (140) are extensions of the main conduit (120). These nozzles (140) act to increase the speed of the airflow (A) passing through them by "nozzle effect" wherein the interior walls of the thrust nozzle (140) smoothly converge and then, optionally, diverge as the airflow (A) progresses from intake to outlet, according to established nozzle performance dictates. FIG. 2B depicts nozzles having this optional convergent to divergent nozzle form (135). In more sophisticated embodiments, the nozzle shape may be dynamically variable while the device is in operation to better conform to ambient conditions, thereby increasing efficiency.

Figure 2C:
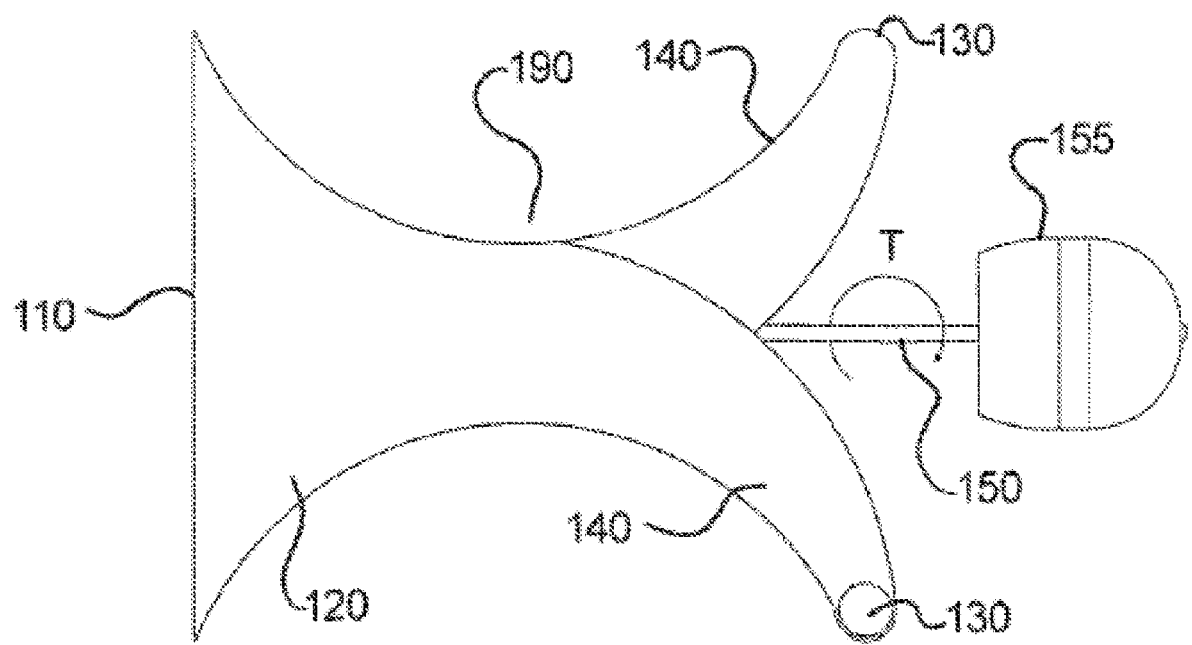
FIG. 2C is a front cross-sectional view of the first embodiment of the wind aeolipile also employing a generator, transmission, pump, or other energy translation/transmission device.

As the flowing air (A) is finally ejected from the nozzle outlet (130), rotational torque (T) is created about a center axis (150). Referring to FIG. 2C, useable work is accomplished by mechanically coupling an electrical generator, mechanical transmission, hydraulic pump, or other energy translation or transmission system (155) to this center axis (150).

The device as depicted in FIG. 1, FIG. 2A, FIG. 2B, FIG. 3, FIG. 4, FIG. 5 and FIG. 6 is configured with two thrust nozzles (140), although as few as one nozzle may be employed, and there is no theoretical maximum number of thrust nozzles (140). The nozzle (140) interior convergent/divergent designs or configurations may be varied according to expected or intended fluid flow rate, specific gravity, and static and dynamic pressure parameters.

Figure 3:
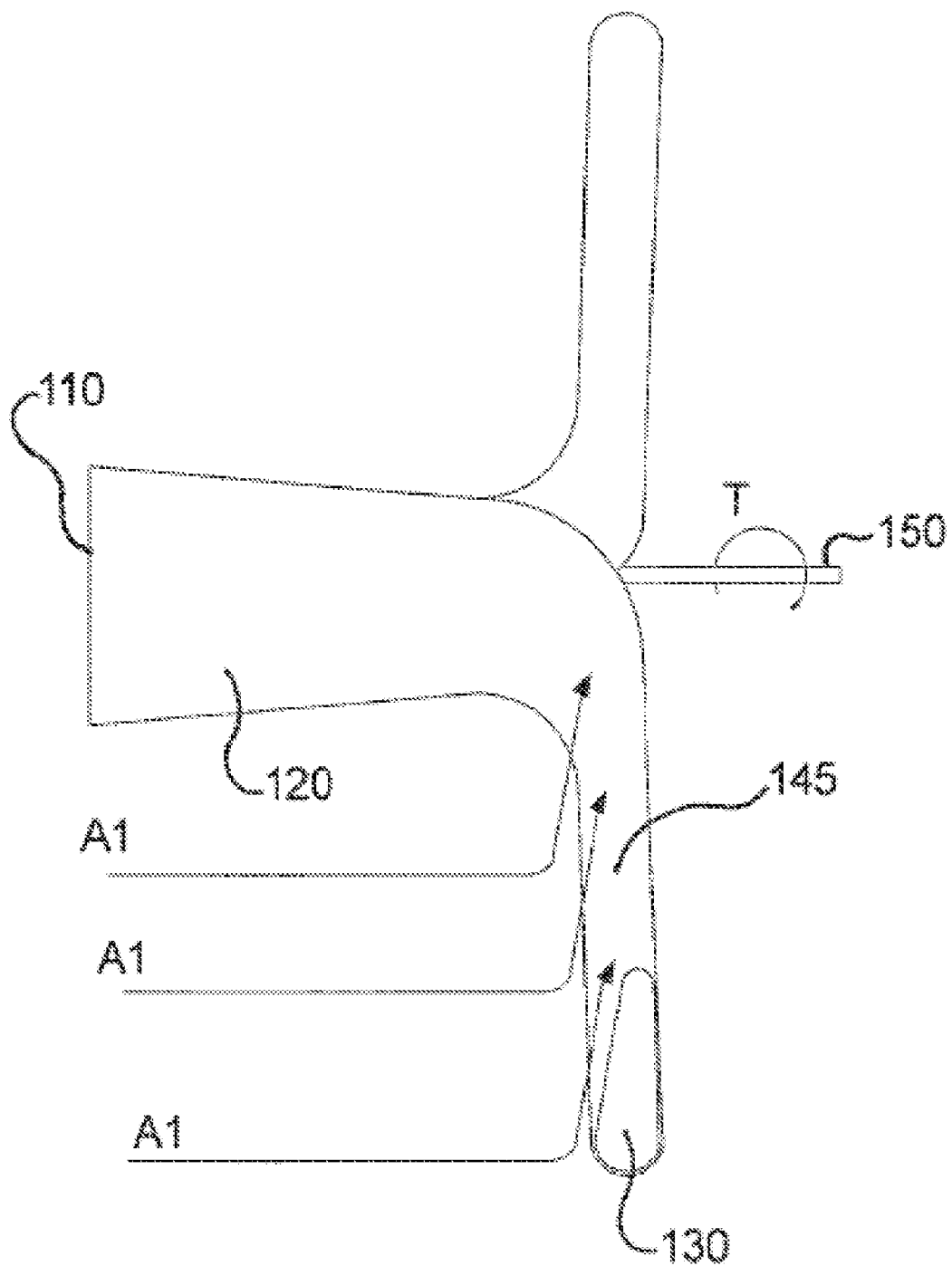
FIG. 3 is a side view of a second embodiment of the wind aeolipile employing blade-shaped nozzles.
Figure 4:
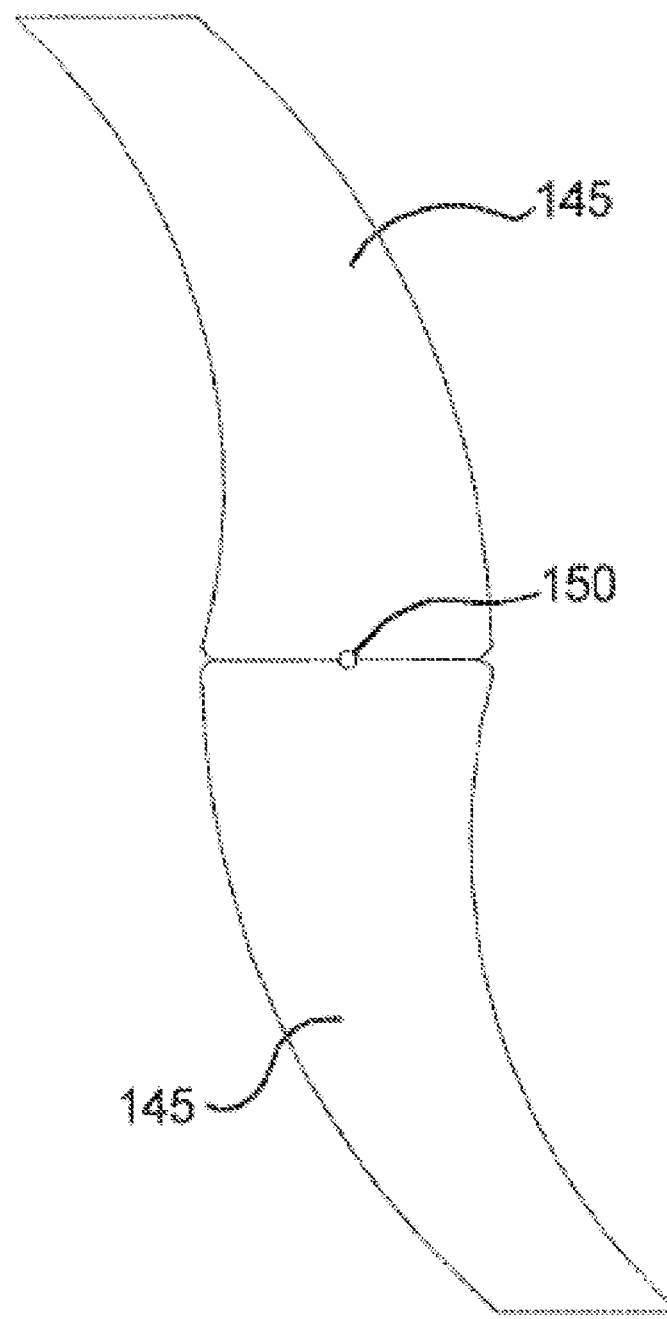
FIG. 4 is a back view of a second embodiment of the wind aeolipile employing blade-shaped nozzles.

In a second embodiment as in FIG. 3 and FIG. 4, blade-shaped thrust nozzles (145) are shaped like hollowed turbine blades. The blade-shaped thrust nozzles (145) extend outward, away from the main conduit (120). Airflow entering the main conduit (120) is directed through the blade-shaped thrust nozzles (145) and leaves the nozzle outlets (130) at right angles to the center axis (150). The bladed-shaped design of the exterior of the blade-shaped thrust nozzles (145) augments the rotational torque (T) as bypassing air (A1) flows past the outside of the blade-shaped thrust nozzles (145).

Figure 5:
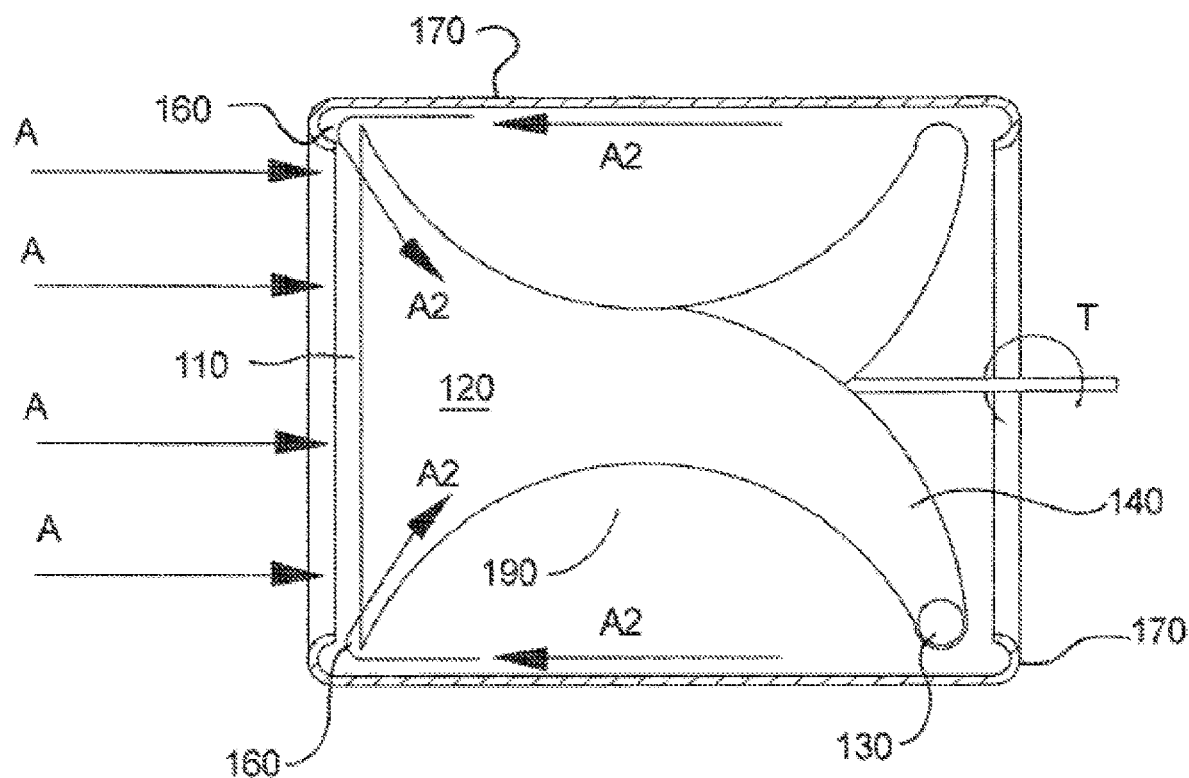
FIG. 5 is a side view of a third embodiment of the wind aeolipile incorporating a surrounding shroud.

In a third embodiment, as in FIG. 5, the wind aeolipile (190), essentially as of the first or second embodiment, is placed inside a cylinder or shroud (170). As the airflow (A) enters the nozzle inlet (110), a suction is created at the narrow opening (160) between the rotating portion and the shroud (170) inlet. Further, after the airflow (A) is ejected from the nozzle outlets (130), part of this bypass airflow (A2) is diverted back through the shroud (170) to ultimately be recycled into the nozzle inlet (110) again. Recycling of the airflow (A) increases efficiency of the device, allowing it to operate in lower velocity wind conditions.

Figure 6:
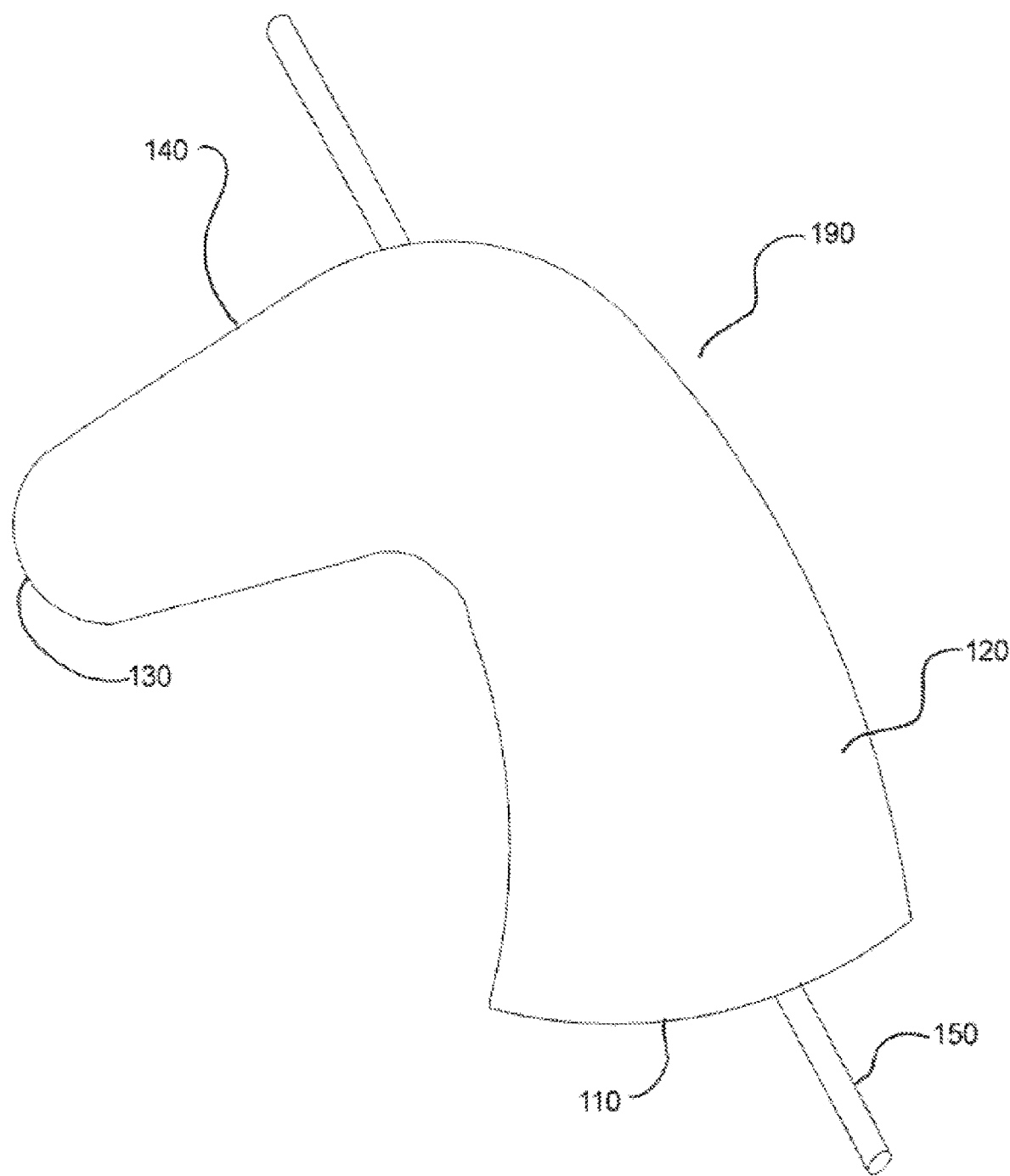
FIG. 6 is a side view of a fourth embodiment of the wind aeolipile employing a single nozzle.
Figure 7:
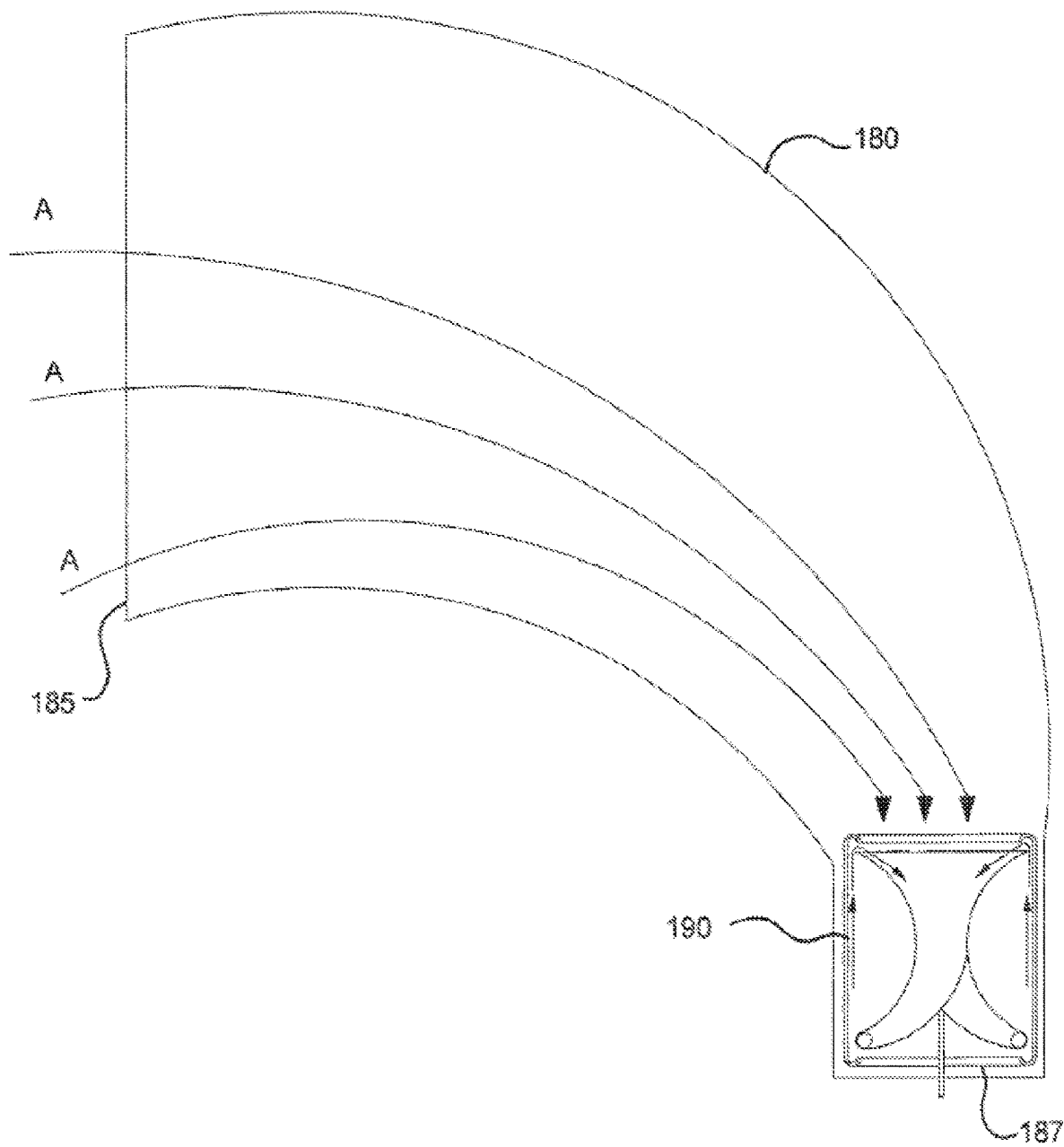
FIG. 7 is a view of an embodiment of the wind aeolipile incorporating a horn-shaped inlet extension.
Figure 8:
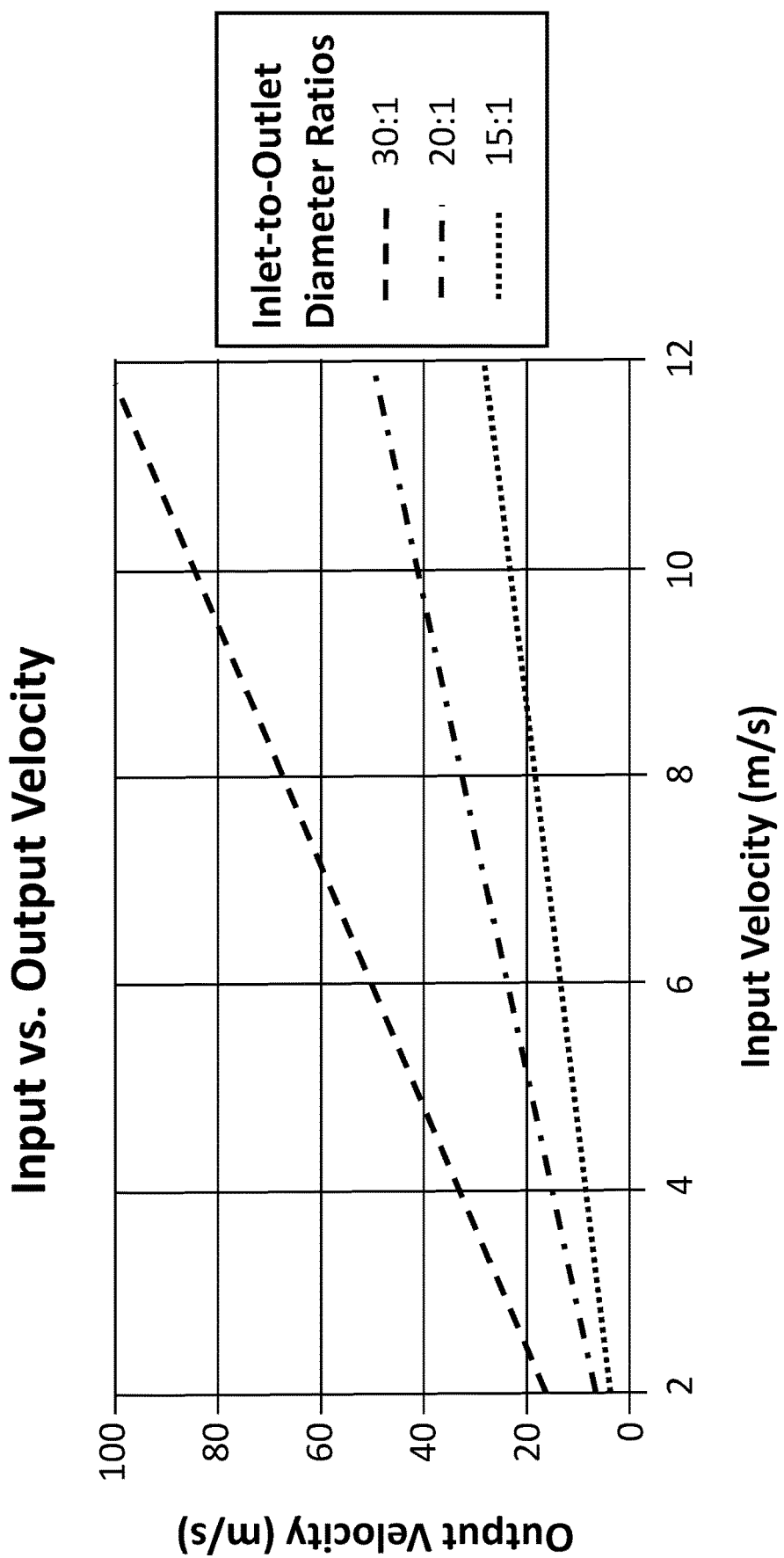
FIG. 8 is a chart of input vs. output airflow velocities of a horn-shaped inlet extension.

In a fourth embodiment, as in FIG. 6 and FIG. 7, an essentially horn-shaped inlet extension (180) is placed with its horn outlet (187) proximal to any embodiment of this wind aeolipile (190), as depicted in FIGS. 1-6. The horn-shaped inlet extension (180) has a larger diameter at the horn inlet (185) than at the horn outlet (187). This horn-shaped inlet extension (180) may be curved or straight. The horn-shaped inlet extension (180) acts to collect an increased volume of airflow (A), and also increases the velocity of the airflow (A) arriving at the outlet (130) of the horn-shaped inlet extension (180).

At the horn outlet (187) of the horn-shaped inlet extension (180), an aeolipile (190) as described in any of the above embodiments or, optionally, a conventional turbine is positioned. The horn-shaped inlet extension (180) will yield higher output power due to the fact that it increases airflow (A) input velocity to the aeolipile (190) as it emerges at the horn outlet (187).

Figure 9A:
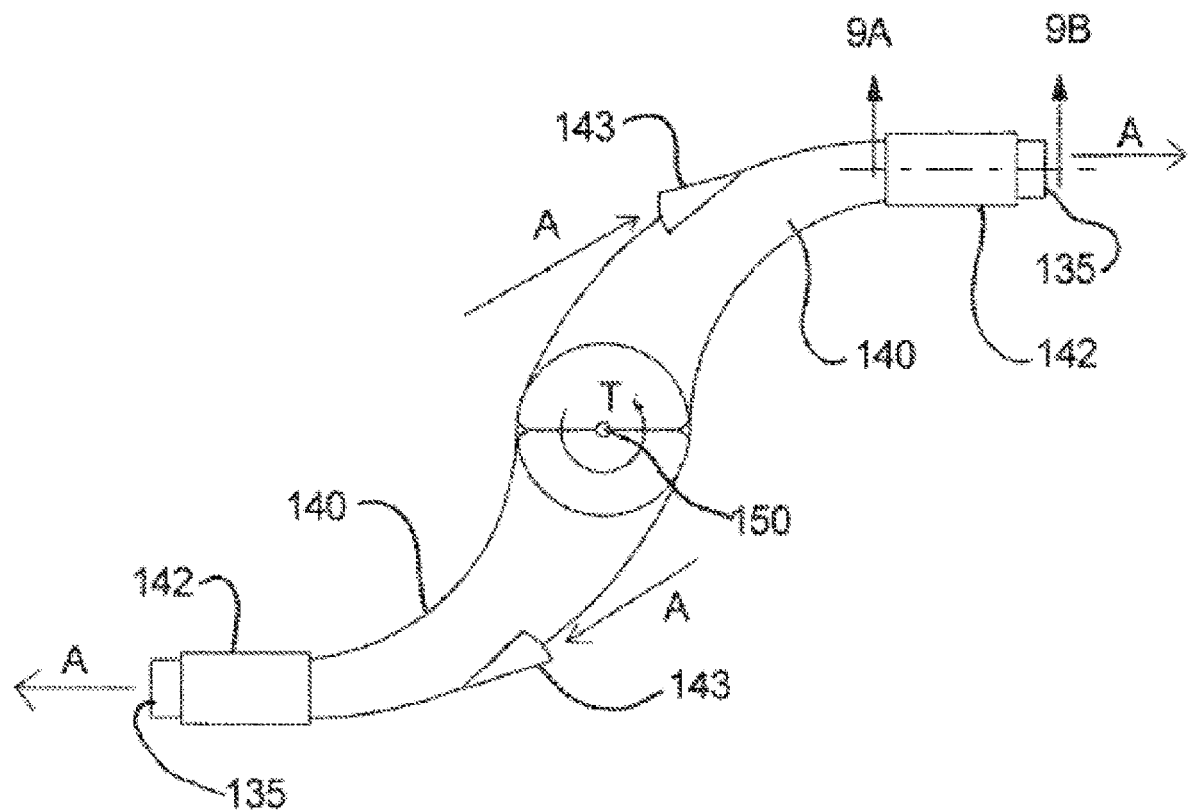
FIG. 9A is a front cross-sectional view of a wind aeolipile showing means of varying the interior diameter of the device proximal to a nozzle and also showing an eductor-ejector inlet of each arm.
Figure 9B:
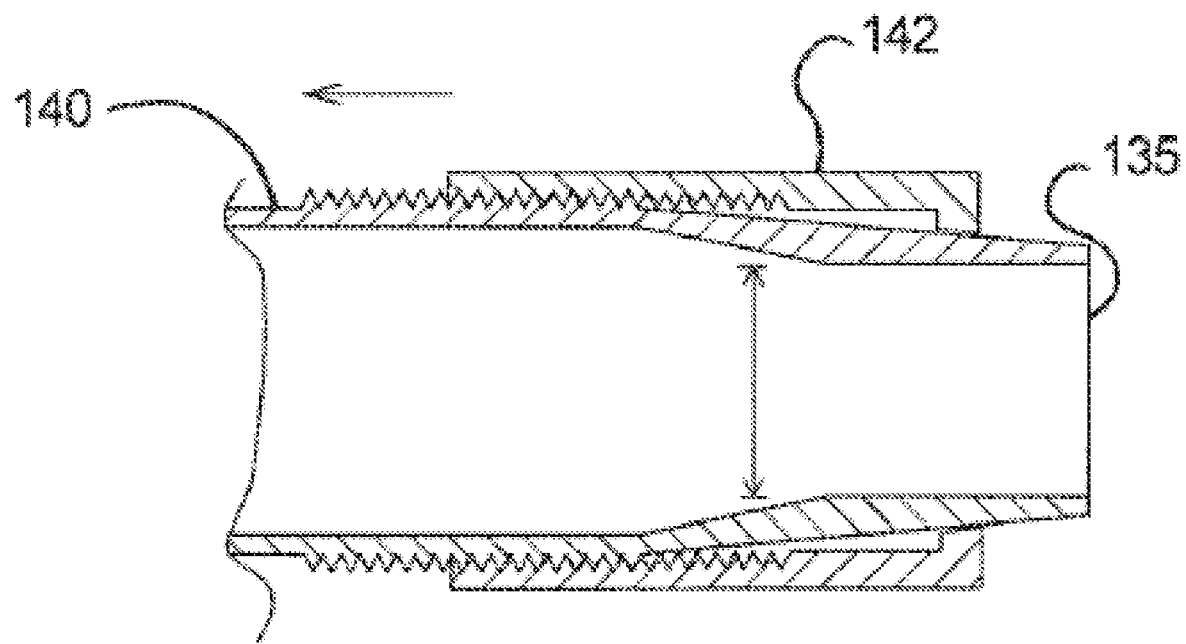
FIG. 9B is a front cross-sectional view of a wind aeolipile showing means of varying the interior diameter of the device proximal to a nozzle.
Figure 9C:
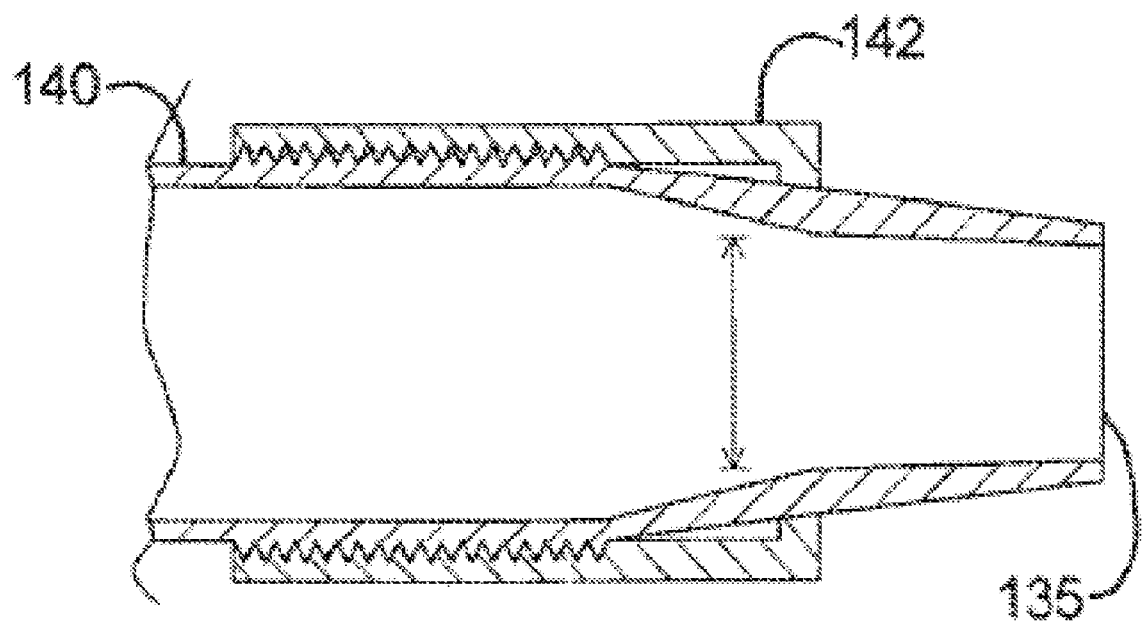
FIG. 9C is a front cross-sectional view of a wind aeolipile showing means of varying the interior diameter of the device proximal to the nozzle.

In other embodiments, the interior or exterior forms of the nozzles or conduits may be controllably variable in such ways as to influence the torque (T), rotation rate, or fluid flow rate through and/or around the device. Referring to FIG. 9A, FIG. 9B, and FIG. 9C, the means of varying the interior forms may include incorporation and control of interior baffles or control of interior nozzle or conduit diameters, such as by employing a nozzle choke device (142) at points encountering the fluid flow.

Figure 10:
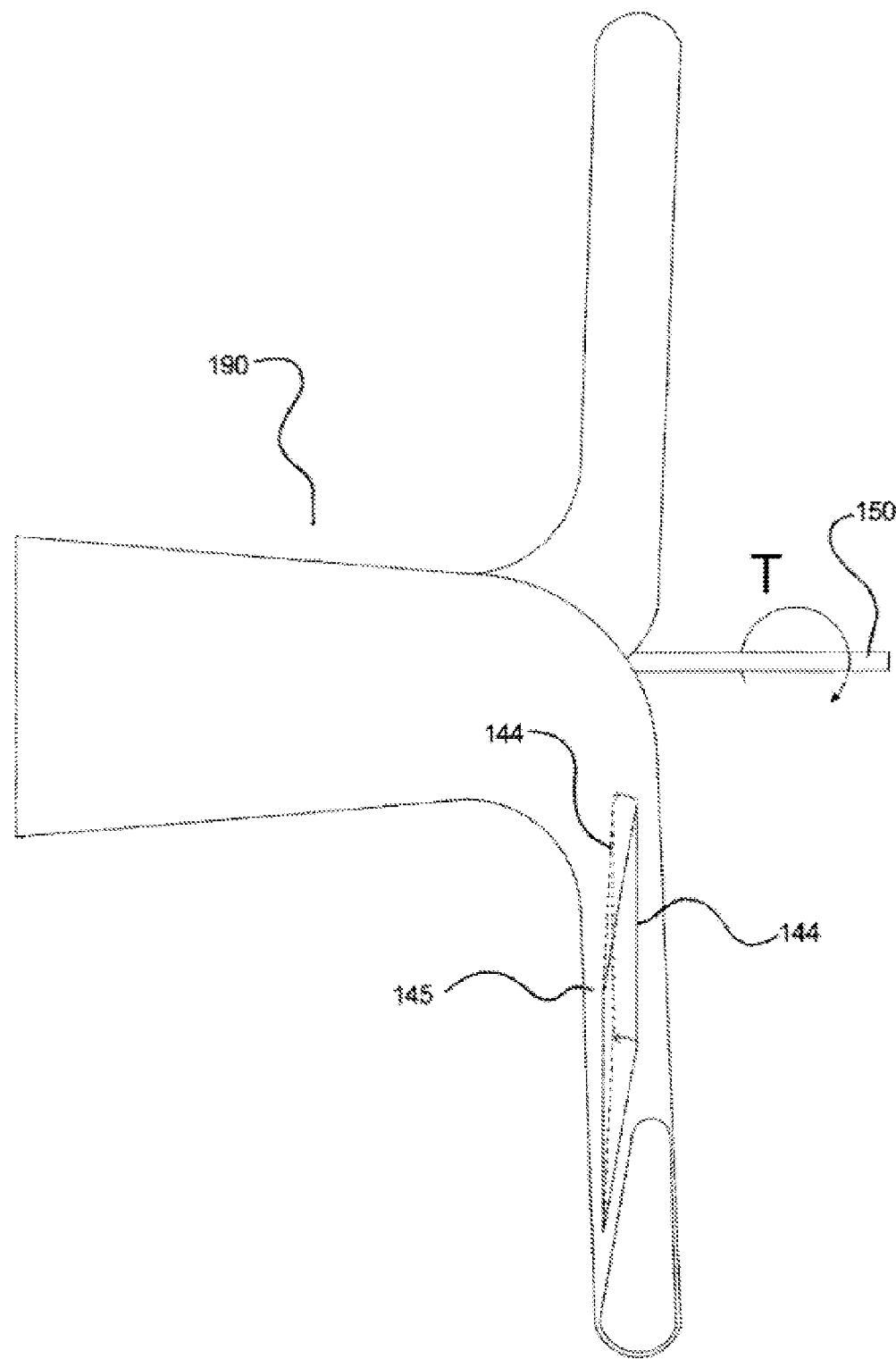
FIG. 10 is a side view of an aeolipile showing exterior control components in the forms of flaps or spoilers.

Referring to FIG. 10, the means of varying the exterior forms may also, or alternatively, include incorporation and control of exterior components such as ailerons, flaps, or spoilers (144).

Figure 9D:
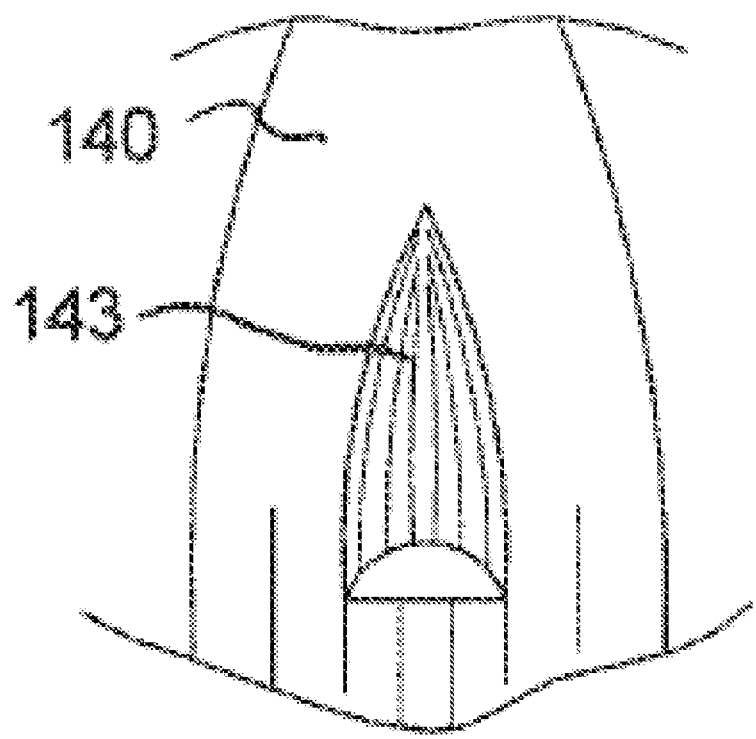
FIG. 9D is an interior view of the eductor-ejector inlet.

Referring again to FIG. 9A and to FIG. 9D, embodiments may further incorporate eductor-ejector functional components, the inlet of which is depicted as an eductor-ejector inlet (143). In such a configuration, the eductor-ejector inlet (143) draws in fluid flow (A) upstream of the area where the flowrate through the aeolipile (190) is greatest. This fluid is then accelerated and ejected along with the fluid flow that was already passing through the aeolipile (190), further augmenting potential thrust and torque (T).

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. An apparatus, comprising:
   a main conduit, including
      a nozzle inlet that includes a first diameter, the nozzle inlet being disposed at a first end of the main conduit, and
      a conduit hollow interior in fluid communication with the nozzle inlet and adapted to receive fluid from the nozzle inlet;
   a plurality of thrust nozzles extending from a second end of the main conduit, wherein the second end is disposed opposite the first end, and wherein each thrust nozzle of the plurality of thrust nozzles includes
      a nozzle outlet that includes a second diameter, the nozzle outlet being disposed at an angle relative to the nozzle inlet, wherein the first diameter is larger than the second diameter, and
      a nozzle hollow interior disposed between the second end and the nozzle outlet; and
   a center axis longitudinally extending from the main conduit,
   wherein at least one thrust nozzle of the plurality of thrust nozzles includes an eductor-ejector located between the nozzle inlet and the nozzle outlet of the at least one thrust nozzle, and wherein each eductor-ejector is adapted to draw additional fluid into the respective thrust nozzle.

2. The apparatus of claim 1, wherein, for each thrust nozzle of the plurality of thrust nozzles, the nozzle outlet is disposed at a 90 degree angle relative to the nozzle inlet.

3. The apparatus of claim 1, wherein the conduit hollow interior narrows from the first end to the second end.

4. The apparatus of claim 1, wherein the nozzle hollow interior of each thrust nozzle of the plurality of thrust nozzles narrows from the second end of the main conduit to the respective nozzle outlet.

5. The apparatus of claim 1, wherein the plurality of thrust nozzles diverge from each other.

6. The apparatus of claim 1, wherein the first diameter is 30 times larger than the second diameter.

7. The apparatus of claim 1, wherein the first diameter is 20 times larger than the second diameter.

8. The apparatus of claim 1, wherein the first diameter is 15 times larger than the second diameter.

9. The apparatus of claim 1, wherein a thrust nozzle of the plurality of thrust nozzles includes at least one of:
   an aileron; or
   a spoiler.

10. The apparatus of claim 1, wherein the center axis is connected to a generator.

11. A system, comprising:
    an aeolipile, including
       a main conduit, including
          a nozzle inlet that includes a first diameter, the nozzle inlet being disposed at a first end of the main conduit, and
          a conduit hollow interior in fluid communication with the nozzle inlet and adapted to receive fluid from the nozzle inlet,
       a plurality of thrust nozzles extending from a second end of the main conduit, wherein the second end is disposed opposite the first end, and wherein each thrust nozzle of the plurality of thrust nozzles includes
          a nozzle outlet that includes a second diameter, the nozzle outlet being disposed at an angle relative to the nozzle inlet, wherein the first diameter is larger than the second diameter, and
          a nozzle hollow interior disposed between the second end and the nozzle outlet, and
       a center axis longitudinally extending from the main conduit; and
    an inlet extension separate from the aeolipile, including
       a horn inlet that includes a third diameter,
       a horn outlet that includes a fourth diameter, wherein the third diameter is larger than the fourth diameter, and wherein the horn outlet is disposed proximal to the aeolipile, and
       an inlet extension body disposed between the horn inlet and the horn outlet.

12. The system of claim 11, wherein the inlet extension body includes a curved shape.

13. The system of claim 11, wherein the inlet extension body includes a straight shape.

14. The system of claim 11, further comprising a generator connected to the center axis of the aeolipile.

15. The system of claim 11, further comprising a pump connected to the center axis of the aeolipile.

16. An apparatus, comprising:
    a main conduit, including
       a nozzle inlet that includes a first diameter, the nozzle inlet being disposed at a first end of the main conduit, and
       a conduit hollow interior in fluid communication with the nozzle inlet and adapted to receive fluid from the nozzle inlet;
    a plurality of thrust nozzles extending from a second end of the main conduit, wherein the second end is disposed opposite the first end, and wherein each thrust nozzle of the plurality of thrust nozzles includes
       a nozzle outlet that includes a second diameter, the nozzle outlet being disposed at an angle relative to the nozzle inlet, wherein the first diameter is larger than the second diameter,
       a nozzle choke device disposed on the nozzle outlet, wherein
          the nozzle choke device includes a ring adapted to engage with the nozzle outlet, and the ring of the nozzle choke device is adapted to adjust the second diameter, and a nozzle hollow interior disposed between the second end and the nozzle outlet; and a center axis longitudinally extending from the main conduit.

17. The apparatus of claim 16, wherein each nozzle choke device is coupled to the respective nozzle outlet.

18. The apparatus of claim 16, wherein the ring of each nozzle choke device is adapted to adjust the second diameter by decreasing the respective second diameter.

19. The apparatus of claim 16, wherein a thrust nozzle of the plurality of thrust nozzles includes at least one of:

an aileron; or a spoiler.

* * * * *